United States Patent
Hernandez et al.

(10) Patent No.: US 11,374,522 B2
(45) Date of Patent: Jun. 28, 2022

(54) ADAPTIVE MODEL FEEDBACK FOR HAPTIC CONTROLLERS

(71) Applicant: TEXAS INSTRUMENTS INCORPORATED, Dallas, TX (US)

(72) Inventors: David Hernandez, Fort Worth, TX (US); Supriyo Palit, Kolkata (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/906,364

(22) Filed: Jun. 19, 2020

(65) Prior Publication Data

US 2021/0135616 A1 May 6, 2021

Related U.S. Application Data

(60) Provisional application No. 62/927,709, filed on Oct. 30, 2019.

(51) Int. Cl.
*H02P 25/034* (2016.01)
*G05B 19/4155* (2006.01)
*H02P 23/00* (2016.01)

(52) U.S. Cl.
CPC ........ *H02P 25/034* (2016.02); *G05B 19/4155* (2013.01); *H02P 23/0022* (2013.01); *G05B 2219/41325* (2013.01)

(58) Field of Classification Search
CPC . H02P 25/034; H02P 23/022; G02B 19/4155; G02B 2219/41325
See application file for complete search history.

(56) References Cited

U.S. PATENT DOCUMENTS

| | | | |
|---|---|---|---|
| 6,437,524 B1 | 8/2002 | Dimanstein | |
| 6,538,402 B2 | 3/2003 | Gokturk et al. | |
| 6,777,895 B2 | 8/2004 | Shimoda et al. | |
| 7,843,277 B2 | 11/2010 | Gregorio et al. | |
| 9,054,627 B2 | 6/2015 | Garg et al. | |
| 10,277,154 B2 | 4/2019 | Hajati et al. | |
| 10,313,787 B2 | 6/2019 | Risbo et al. | |
| 10,601,355 B2 | 3/2020 | Vasudevan et al. | |

(Continued)

OTHER PUBLICATIONS

Supriyo Palit et al., (Assignee: Texas Instruments, Inc.), U.S. Appl. No. 16/656,490, filed Apr. 23, 2020, 22 pages.

*Primary Examiner* — Rina I Duda
(74) *Attorney, Agent, or Firm* — John R. Pessetto; Charles A. Brill; Frank D. Cimino

(57) ABSTRACT

Disclosed embodiments include an apparatus for closed loop control of a linear resonant actuator comprising a motor drive circuit configured to provide a motor drive signal, a current and voltage sensing circuit coupled to the output terminal of the motor drive circuit and across the motor, and having current sense and a voltage sense outputs. A resonant frequency and back emf extraction circuit receives the current sense and voltage sense outputs, and outputs a resonant frequency signal output and a measured back emf signal output. An actuator model circuit has inputs coupled to the output of the motor drive circuit, the resonant frequency signal output, and a mechanical system quality factor signal generated by an adaptation circuit having an input coupled to the error summing circuit output. The error summing circuit has inputs coupled to the output of the actuator model and the measured back emf signal.

20 Claims, 2 Drawing Sheets

(56) References Cited

U.S. PATENT DOCUMENTS

| | | |
|---|---|---|
| 2003/0102828 A1 | 6/2003 | Kusakabe |
| 2003/0118193 A1 | 6/2003 | Leske et al. |
| 2010/0153845 A1* | 6/2010 | Gregorio ................. G06F 3/041 |
| | | 715/702 |
| 2012/0229264 A1* | 9/2012 | Company Bosch .. B06B 1/0253 |
| | | 340/407.1 |
| 2016/0103489 A1* | 4/2016 | Cruz-Hernandez ..... G06F 1/163 |
| | | 345/161 |
| 2017/0133966 A1* | 5/2017 | Khan .................... H02P 25/034 |
| 2017/0169674 A1* | 6/2017 | Macours .................. G08B 6/00 |
| 2017/0256145 A1* | 9/2017 | Macours .................. G08B 6/00 |

* cited by examiner

ADAPTIVE MODEL FEEDBACK FOR HAPTIC CONTROLLERS

RELATED APPLICATION

This patent arises from an application claiming the benefit of U.S. Provisional Patent Application Ser. No. 62/927,709, which was filed on Oct. 30, 2019. U.S. Provisional Patent Application Ser. No. 62/927,709 is hereby incorporated herein by reference in its entirety. Priority to U.S. Provisional Patent Application Ser. No. 62/927,709 is hereby claimed.

BACKGROUND

A linear resonant actuator (LRA) is a vibration motor that produces an oscillating force along a single axis to provide haptic feedback. An LRA uses an AC voltage to drive a voice coil that produces an electromagnetic field. The electromagnetic field moves a magnetic mass that is connected to a spring, resulting in a haptic vibration. Numerous cell phone manufacturers use LRAs to produce a wide range of vibrotactile effects. Other types of consumer electronics, e.g. tablets, laptops, and video game controllers, also use LRAs to provide haptic vibration feedback.

When the voice coil of the LRA is driven at the resonant frequency of the LRA, the LRA can vibrate with its maximum force. When an LRA is driven at its resonant frequency, power efficiency is improved and the force of its vibration is increased. Operating a high-Q LRA resonator outside a narrow range centered at the LRA's resonant frequency can result in a significant reduction in the amplitude of vibration.

The resonant frequency of the spring can vary and change over time due to a variety of factors including temperature, aging, and humidity. For instance, a spring can become less stiff over time due to use and wear. One approach to tracking resonant frequency and controlling the drive frequency is to toggle between drive and sense modes in each drive cycle. While in sense mode, the back emf (BEMF) is measured and used to iteratively adjust the drive frequency. However, switching between drive and sense modes can result in reduced efficiency and vibration amplitude, and can introduce mechanical noise.

While the examples given relate to linear resonant actuators such as for haptic feedback devices, this disclosure applies more generally to resonant frequency tracking and control for resonator devices.

SUMMARY

Example embodiments include an apparatus for closed loop control of a linear resonant actuator comprising a motor drive circuit having an input terminal and an output terminal wherein the output terminal is configured to provide a motor drive to a motor. There is a current and voltage sensing circuit having a first input terminal coupled to the output terminal of the motor drive circuit, a second input terminal coupled across the motor, and current and voltage sense outputs. Additionally, there is a resonant frequency and back emf extraction circuit having a first input terminal coupled to the current sense output and a second input terminal coupled to the voltage sense output, and having a first output terminal providing a resonant frequency signal output and a second output terminal providing a measured back emf signal output. Also, there is an actuator model circuit having a first input terminal coupled to the output of the motor drive circuit, a second input terminal coupled to the resonant frequency signal output, a third input terminal, and an output terminal, an error summing circuit having a first input coupled to the output terminal of the actuator model, a second input coupled to the measured back emf signal output, and an output, and an adaptation circuit having an input terminal coupled to the output of the error summing circuit and an output coupled to the third input terminal of the actuator model.

A second example embodiment includes a method for closed loop control of a linear resonant actuator comprising generating a motor drive signal based on a target back emf input signal, adapting the motor drive signal to be applied to a motor, measuring current and voltage of the motor drive signal and converting each to a digital signal, and extracting values for a resonant frequency and a measured back emf based on the digitized current and voltage measurements. The method also includes generating a modeled back emf, subtracting the modeled back emf from the measured back emf and applying an averaging technique to the result to calculate a quality factor. It further includes subtracting the modeled back emf from the target back emf input signal and outputting the result to the motor drive circuit.

Like reference symbols in the various drawings indicate like elements. Details of one or more implementations of the present disclosure are set forth in the accompanying drawings and the description below. The figures are not drawn to scale and they are provided merely to illustrate the disclosure. Specific details, relationships, and methods are set forth to provide an understanding of the disclosure. Other features and advantages may be apparent from the description and drawings, and from the claims.

DETAILED DESCRIPTION

A resonator is driven by a resonator drive signal at a resonator drive frequency. The resonator drive frequency is preferably at or near a resonant frequency $f_0$ of the resonator system. One approach to tracking the resonant frequency and controlling the resonator drive frequency is to toggle between drive and sense modes as part of each drive cycle. However, toggling between drive and sense modes brings undesirable inefficiencies. In the example implementations, the resonator is driven continuously based on either a resonator drive voltage (V) or a resonator drive current (I). Continuous resonator drive means the resonator is driven without interruption for a separate sense mode to measure back emf (BEMF) during each cycle. A linear resonant actuator (LRA) is an example of such a resonator.

Figure 1:
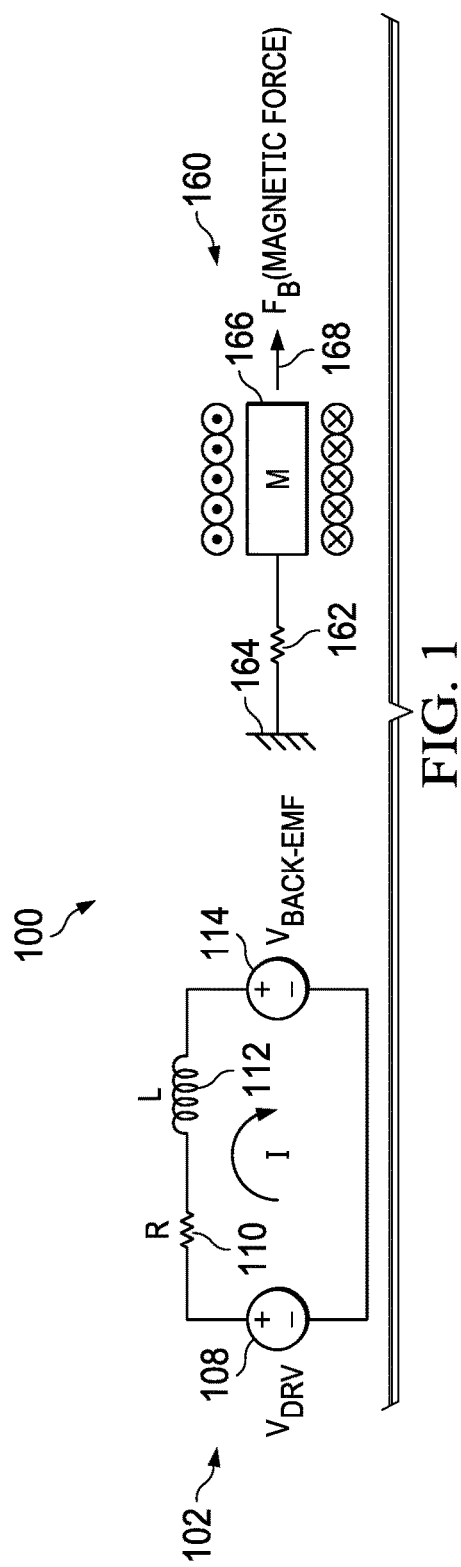
FIG. 1 shows an example model of an LRA.

FIG. 1 shows an example model 100 of an LRA. The electrical portion 102 of LRA model 100 comprises a motor driver circuit 108, a motor coil DC resistance 110, a motor coil inductance 112, and a BEMF voltage 114. A motor drive signal is generated by the motor drive circuit 108 and can be applied to the LRA motor, which is modeled electrically as a DC resistance 110 in series with a motor coil inductance 112. The application of a motor drive signal 108 to the motor results in motion and the motor generating a BEMF voltage 114. The BEMF 114 opposes the motor drive signal 108 and provides feedback indicative of system characteristics.

The mechanical portion 160 of the LRA model 100 includes a spring 162 attached to a mechanical ground 164 on one end, and to a magnetic mass 166 on the other end. There is an electromagnetic force 168 that results from the motor drive signal 108 driving the LRA motor coil 112.

Electrical current passes through the motor coil 112 and creates a magnetic field. The magnetic field interacts with the magnetic flux of the magnetic mass 166 and injects a force into the mechanical system which moves the magnetic mass 166. The amount of force applied to the magnetic mass 166 is proportional to the current that passes through the motor coil 112. The magnetic mass 166 is attached to a mechanical ground 164 with a spring 162. If a force is applied in the direction to the right, the magnetic mass 166 will move to the right as long as the force continues to be applied, or until the resistance of the spring 162 equals that force, at which time the magnetic mass 166 will stop moving.

Once the current through the coil 112 is stopped, the spring 162 will contract, exerting a force to move the magnetic mass 166 in the opposite direction. The spring 162 will contract to the point that it begins to push the magnetic mass 166 away, causing the magnetic mass 166 to move again in the first direction. The system will continue to resonate in this manner at a resonant frequency. The resonant frequency may be influenced by multiple factors including how stiff the spring is and how heavy the magnetic mass is. In some examples, the resonant frequency may be in the range between 150 Hz and 250 Hz.

The acceleration of the magnetic mass is optimized when the magnetic field created by the drive current results in a force in the same direction the magnetic mass is moving, and when the motor drive current changes direction at the same time the spring reaches the end of its excursion. Therefore, it is desirable that the motor drive current and the motion of the magnetic mass be synchronized in both phase and frequency to improve LRA efficiency and optimize the vibration strength of the LRA.

The mechanical resonant frequency of the LRA can change due to such factors as temperature, aging in the spring and other components, mechanical mounting, and whether the device is being gripped tightly or lying on a table. As the spring ages and its time of use increases, the spring can get softer, causing the spring constant to decrease, leading to a decrease in the resonant frequency. Therefore, it is beneficial to continuously track the resonant frequency of the LRA so that changes in the resonant frequency can be sensed and the frequency of the electrical motor drive can be adjusted accordingly.

The motor drive signal 108 is bipolar so that the magnetic mass 166 can be driven in both directions. The shape of the motor drive signal 108 can be any bipolar shape such as sinusoidal, triangular, or a square wave.

Figure 2:
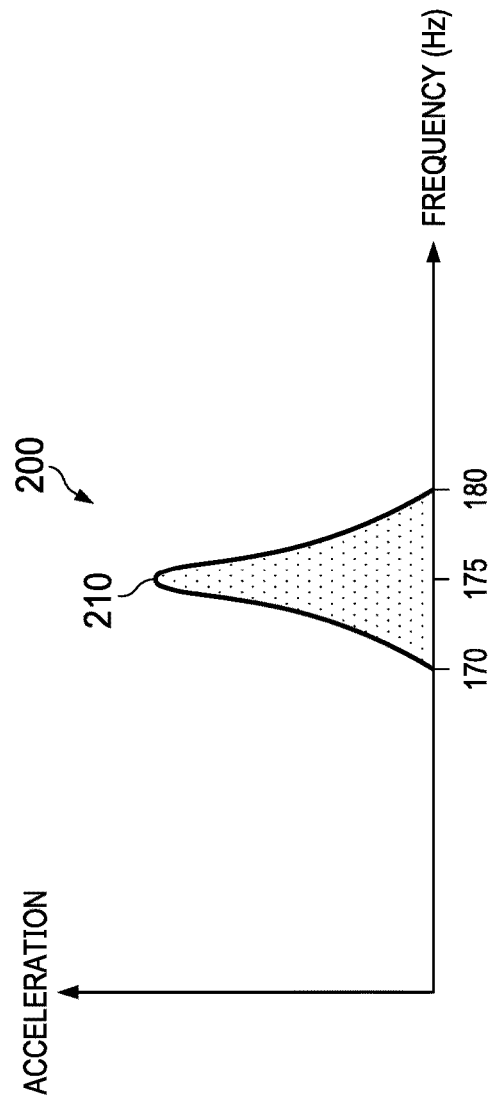
FIG. 2 shows an example graph of the acceleration of a magnetic mass as a function of the motor drive signal frequency for an LRA system.

FIG. 2 shows an example graph 200 of the acceleration of a magnetic mass as a function of the motor drive signal frequency for an LRA system having a resonant frequency 210 of 175 Hz. The LRA responds as a bandpass filter having a relatively high Q-factor, meaning it has a relatively small bandwidth. The highest acceleration occurs when the LRA is driven at the resonant frequency 210. The acceleration of the magnetic mass drops significantly as the motor drive frequency deviates from the resonant frequency to either a higher frequency or a lower frequency. The higher the Q-factor of the LRA, the more advantageous it is to track the resonant frequency and adjust the drive frequency to match the resonant frequency.

LRAs can be driven with a closed-loop architecture that uses an alternating drive and sense mode during each cycle, with the sense mode used to measure BEMF. However, use of a separate sense mode limits the amount of time that energy can be delivered to the LRA.

BEMF can be measured or computed using current and voltage measurements. However, the distortion associated with the current sense circuit and the delay associated with the analog-to-digital conversion of the current and voltage data can introduce distortion on the output and phase lag that can lead to instability of the control loop. For example, a measured BEMF provides instantaneous values as feedback for the closed loop control, and instantaneous values may be prone to noise and distortion. Any effort to reduce the noise and distortion, such as by adding a filter, can result in a phase delay, which can result in closed loop instability of the LRA control loop.

Figure 3:
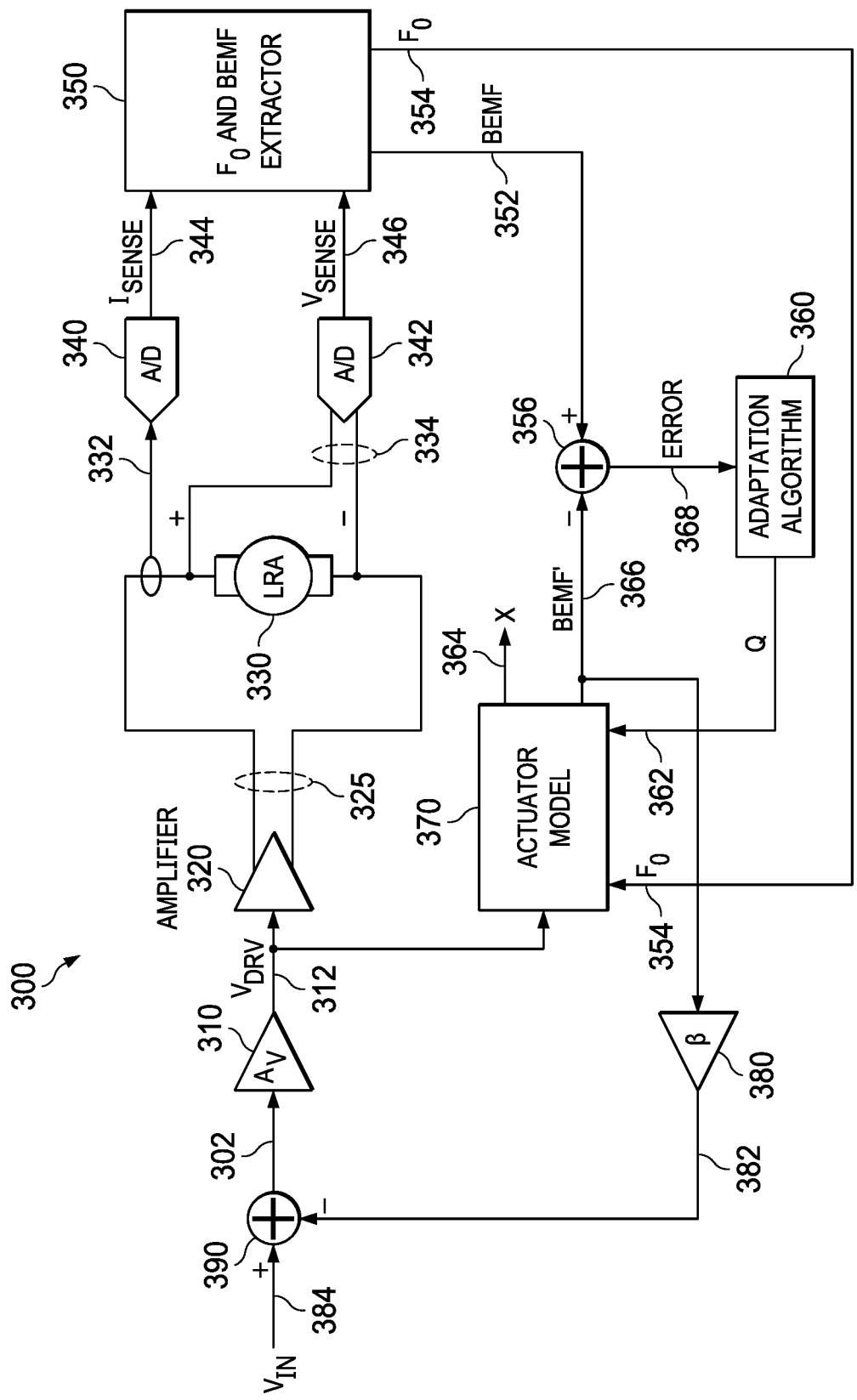
FIG. 3 shows a block diagram of an example embodiment for a resonant actuator system, including an example resonant frequency tracking and amplitude control architecture to continuously drive a resonator at a resonant frequency ($f_0$) and a target amplitude. An $f_0$ tracking loop adjusts the resonator drive frequency, and an amplitude control loop is based on a target input voltage and a model-based BEMF voltage. The model-based BEMF voltage is generated by an adaptive actuator model based on a comparison of the modeled generated BEMF to a measured BEMF.

In contrast, using a model based BEMF can provide reduced noise and distortion compared to a measured BEMF because a model based BEMF uses adaptive parameters. Adaptive parameters are less prone to instantaneous errors because they use averaging techniques such as, for example, a least mean square or recursive least squares algorithm. In haptic devices, factors such as temperature and normal wear and tear produce slow changing effects, so instantaneous adaptation of the parameters is not required. Another potential error source in some embodiments is delay caused by the communication interface between A/D converters and digital signal processors. By replacing the measured BEMF in the control loop with a modeled BEMF that is less prone to instantaneous noise and distortion and does not suffer from delays caused by other circuitry, the BEMF output that is provided to the control loop is more accurate and makes the control loop more stable. Another possible FIG. 3 illustrates an example LRA actuator system, including an example resonant frequency tracking and control architecture, to continuously drive a resonator at a resonant frequency $f_0$, including an $f_0$ tracking and control loop to adjust the resonator drive frequency. Motor drive circuit 310 is a voltage drive circuit receiving its input 302 from summing junction 390. The output, $V_{DRV}$ 312, of the motor drive circuit 310 is coupled to the input of an amplifier 320 which in some examples may provide current or voltage amplification. The output 325 of the amplifier 320 is provided to an LRA 330 driving the motor in the LRA 330.

A current signal 332 from the amplifier output 325 is coupled to the input of an analog-to-digital converter (ADC) 340. The output of ADC 340 is a digitized current sense signal 344 representing the current flowing through the motor coil of the LRA 330. The voltage 334 across the LRA 330 is measured by coupling the voltage to the input of an ADC 342. The output of ADC 342 is a digitized voltage sense signal 346 representing the voltage across the motor of the LRA 330. In some examples, ADCs 340 and 342 could be implemented with sigma-delta converters.

The current sense signal 344 and the voltage sense signal 346 are coupled to the input of an $f_0$ and BEMF extractor circuit 350. The $f_O$ and BEMF extractor circuit 350 takes the current sense signal 344 and the voltage sense signal 346 as inputs and outputs the resonant frequency $f_O$ 354 and the BEMF 352. The resonant frequency $f_O$ 354 can be extracted from the sensed current and voltage signals using a technique such as described in U.S. patent application Ser. No. 16/856,490.

The BEMF 352 can be calculated from the sensed current and voltage signals using the equation:

$$BEMF = V_{SENSE} - I_{SENSE}R_E - L_E\frac{dI_{SENSE}}{dt}$$

where $V_{SENSE}$ is from the voltage sense signal 346, $I_{SENSE}$ is from the current sense signal 344, $R_E$ is the DC resistance of the motor coil of the LRA 330, and $L_E$ is the inductance of the motor coil of the LRA 330. The last term of the equation, the contribution due to the inductance, is included in the BEMF calculation to improve the accuracy of the BEMF magnitude and phase characteristics by eliminating frequency dependent magnitude and phase distortions due to the coil's inductance when the BEMF is extracted. While the frequency dependent characteristics of the inductance may not be significant in all applications, it can be significant in modeling and driving high-Q actuators such as for LRA and haptic applications.

The actuator model 370 has as its inputs $V_{DRV}$ 312, $f_O$ 354 and the system Q factor 362, which is generated by the adaptation algorithm 360. The output of the actuator model 370 is a modeled BEMF value, BEMF' 366. In some examples, the actuator model 370 may also have as an output a modeled value for the displacement X 364 of the mass.

The equation that the actuator model 370 may use in some example embodiments to determine the value for BEMF' 366 is:

$$BEMF'(s) = V_{DRV}(s) * \frac{s\frac{Bl^2}{MR_E}}{s^2 + s\left(\frac{R}{M} + \frac{Bl^2}{MR_E}\right) + \frac{K}{M}}$$

where $R_E$ is the DC resistance of the coil, Bl is the force factor of the mechanical system, M is the mass of the magnetic mass 166, R is the mechanical loss due to friction and K is the spring constant of the spring 162.

Because Bl and the mass M do not change due to aging and operating conditions, they can be initially characterized and will remain the same. Also, it is not necessary to break out the contributions from BL and M separately, so the term $BL^2/M$ can be replaced by a constant, A where $A=BL^2/M$. The Q-factor of the mechanical system, $Q_{ms}$ can be expressed as $\omega_0*(M/R)$, where $\omega_0=2\pi*f_0$. The equation for BEMF' 366 can be expressed as:

$$BEMF'(s) = V_{DRV}(s) * \frac{\frac{A}{R_B}s}{s^2 + \left(\frac{N_0}{Qms} + \frac{A}{R_E}\right)s + \omega_0^2}$$

The coil resistance $R_E$ can be extracted and monitored as a function of time using a low frequency pilot tone. The resonant frequency $\omega_0$ is obtained from the $f_O$ and BEMF extractor circuit 350. Therefore, $Q_{ms}$ is the only unknown unknown variable in the equation for the BEMF model, BEMF' 366. The Q-factor of the mechanical system, $Q_{ms}$ can be obtained by calculating the error between the measured BEMF 352 and the modeled BEMF' 366 and applying an adaptation algorithm 360 to the error signal. In some examples the actuator model 370 may also have as an output a modeled displacement X 364 of the magnetic mass 166. Monitoring the modeled displacement 364 of the magnetic mass 166 can be useful to prevent over excursion of the magnetic mass, which could result in damage to the LRA. The equation for X 364 can be expressed as:

$$X(s)=s(1BL*BEMF')$$

The measured BEMF 352 is fed to a summing junction 356. The modeled BEMF' 366 is fed to the summing junction 356 and subtracted from the measured BEMF 352 resulting in an error output signal 368. The error signal 368 is input to adaptation algorithm 360. The adaptation algorithm 360 could be one of various adaptation algorithms such as, but not limited to, a least mean square algorithm or a recursive least squares algorithm. The output of the adaptation algorithm 360 is Q 362, which is the Q-factor of the mechanical system, $Q_{ms}$.

The output of the adaptation algorithm, Q 362, is coupled to the actuator model 370 as an input together with $f_O$ 354 and $V_{DRV}$ 312. As described, the actuator model takes these inputs and generates a BEMF model, BEMF' 366. The BEMF' signal 366 is input to a gain stage 380 having a gain β. The value of β can be 1 or can be some other value. The output 382 of gain stage 380 is subtracted from an input voltage, $V_{IN}$ 384 at summing junction 390.

The input voltage $V_{IN}$ 384 is the target BEMF amplitude that provides the desired haptics vibration strength. A large amplitude at $V_{IN}$ 384 will result in a strong vibration, and a small amplitude will result in a weak vibration. In this manner, the haptics vibration effect can be modulated by $V_{IN}$ 384, and the closed loop feedback ensures that the output of the motor drive circuit 310 follows the input from $V_{IN}$ 384.

The amplitude of the input voltage $V_{IN}$ 384 comes from an external source and the frequency of the input voltage $V_{IN}$ 384 is derived from the resonant frequency $f_O$ 354. The output of summing junction 390 is a voltage input 302 to the motor drive circuit 310 with an updated frequency and amplitude based on the data from the previous cycle, thus providing stable closed loop feedback to drive the LRA 330.

In some example implementations, a device can include a fully integrated resonator driver circuit and frequency/amplitude tracking/control circuitry, including current and voltage sensing, with dedicated frequency and amplitude tracking/control circuitry. In other example implementations, the device can include both the resonator driver circuit and the frequency and amplitude tracking and control circuitry including current and voltage sensing, where the frequency and amplitude tracking and control circuitry is implemented in an integrated digital signal processor (DSP). Alternatively, the device can include only the resonator driver circuit and current and voltage sensing circuitry, and the frequency and amplitude tracking and control circuitry can be implemented using an external DSP.

For the purposes of this disclosure, if an element is referred to as being "coupled" to another element, it may be directly coupled to the other element, or intervening elements may exist. If an element is referred to as being "directly coupled" to another element, no other intervening elements are intentionally disposed. The terms "substantially the same," "substantially equal," "substantially equal," "approximately equal," and "approximately the same" describe a quantitative relationship between two objects. This quantitative relationship may prefer the two objects to be equal by design but with the anticipation that a certain amount of variations can be introduced by the fabrication process.

While operations are depicted as occurring in a particular order, this should not be understood as requiring that all illustrated operations be performed or that the operations are required to be performed in that order to achieve desirable results unless such order is recited in one or more claims. In certain circumstances, multitasking and parallel processing may be advantageous. Moreover, the separation of various system components in the embodiments described above should not be understood as requiring such separation in all embodiments.

What is claimed is:

1. An apparatus for closed loop control of a linear resonant actuator comprising:
    a motor drive circuit having an input terminal and an output terminal, wherein the output terminal provides a motor drive signal.
    a current and voltage sensing circuit having a first input terminal coupled to the output terminal of the motor drive circuit, a second input terminal coupled across the motor, and having a current sense output and a voltage sense output;
    a resonant frequency and back emf extraction circuit having a first input terminal coupled to the current sense output and a second input terminal coupled to the voltage sense output, and having a first output terminal providing a resonant frequency signal output, and a second output terminal providing a measured back emf signal output;
    an actuator model circuit having a first input terminal coupled to the output of the motor drive circuit, a second input terminal coupled to the resonant frequency signal output, a third input terminal, and an output terminal;
    an error summing circuit having a first input coupled to the output terminal of the actuator model, a second input coupled to the measured back emf signal output, and an output; and
    an adaptation circuit having an input terminal coupled to the output of the error summing circuit and an output coupled to the third input terminal of the actuator model.

2. The apparatus of claim 1, including:
    an input summing circuit having a first input terminal coupled to an input voltage terminal, a second input terminal, and an output terminal coupled to the input terminal of the motor drive circuit; and
    a feedback buffer having an input coupled to the output terminal of the actuator model and an output coupled to the second input terminal of the input summing circuit.

3. The apparatus of claim 1, wherein the current and voltage sensing circuit includes a first analog-to-digital converter (ADC) having an input coupled to the output terminal of the motor drive circuit and an output coupled to the first input terminal of the resonant frequency and back emf extraction circuit, and a second ADC having an input coupled across the motor and an output coupled to the second input terminal of the resonant frequency and back emf extraction circuit.

4. The apparatus of claim 2, wherein the motor drive circuit includes a first amplifier having an input and an output wherein the input is coupled to the output terminal of the input summing circuit, and a second amplifier having an input and a differential output wherein the input is coupled to the output of the first amplifier and the output is coupled across the motor.

5. The apparatus of claim 2, wherein the feedback driver has unity voltage gain.

6. The apparatus of claim 2, wherein the feedback driver has a voltage gain less than 1.

7. The apparatus of claim 1, wherein the adaptation circuit uses a least mean squares algorithm.

8. The apparatus of claim 1, wherein the adaptation circuit uses a recursive least squares algorithm.

9. The apparatus of claim 1, wherein the actuator includes a second output terminal that outputs a signal proportional to a modeled value of the excursion of a mass.

10. The apparatus of claim 2, wherein the amplitude of the signal at the input voltage terminal is proportional to a target back emf.

11. The apparatus of claim 2, wherein the frequency of the signal at the input voltage terminal is determined by the resonant frequency.

12. A method for closed loop control of a linear resonant actuator comprising:
    generating, by a motor drive circuit, a motor drive signal having an amplitude based on a target back emf input signal, and adapting the motor drive signal to be applied to a motor;
    measuring current and voltage of the motor drive signal and converting each to a digital signal;
    extracting values for a resonant frequency and a measured back emf based on the digitized current and voltage measurements;
    generating, using an actuator model, a modeled back emf;
    subtracting the modeled back emf from the measured back emf and applying an averaging technique to the result to calculate a quality factor; and
    subtracting the modeled back emf from the target back emf input signal and outputting the result to the motor drive circuit.

13. The method of claim 12, wherein the actuator model has as inputs the quality factor, the resonant frequency, and the motor drive signal.

14. The method of claim 12, wherein the modeled back emf is amplified by a back emf amplifier prior to being subtracted from the target back emf.

15. The method of claim 14, wherein the back emf amplifier has a gain of unity.

16. The method of claim 14, wherein the back emf amplifier has a gain less than 1.

17. The method of claim 12, wherein the averaging technique is a least means squares algorithm.

18. The method of claim 12, wherein the averaging technique is a recursive least squares algorithm.

19. The method of claim 12, wherein the actuator model also generates a modeled value for the displacement of a mass.

20. The method of claim 12, wherein the modeled back emf is a function of the quality factor and a DC resistance of the motor.

* * * * *